United States Patent
Slutsky et al.

(10) Patent No.: US 9,426,337 B2
(45) Date of Patent: Aug. 23, 2016

(54) APPARATUS, METHOD AND VIDEO DECODER FOR RECONSTRUCTING OCCLUSION REGION

(71) Applicant: Samsung Electronics Co., Ltd., Suwon-Si, Gyeonggi-Do (KR)

(72) Inventors: Michael Slutsky, Ramat-Gan (IL); Yun-Seok Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 354 days.

(21) Appl. No.: 13/944,594

(22) Filed: Jul. 17, 2013

(65) Prior Publication Data
US 2014/0022453 A1    Jan. 23, 2014

(30) Foreign Application Priority Data
Jul. 19, 2012 (KR) .......................... 10-2012-0078860

(51) Int. Cl.
*H04N 5/14* (2006.01)
*H04N 7/01* (2006.01)
(52) U.S. Cl.
CPC .............. *H04N 5/145* (2013.01); *H04N 7/0127* (2013.01)
(58) Field of Classification Search
CPC ................................ H04N 5/145; H04N 7/0127
See application file for complete search history.

(56) References Cited

U.S. PATENT DOCUMENTS

| | | | | |
|---|---|---|---|---|
| 5,028,996 A | * | 7/1991 | Takahashi | G06T 7/2013 348/E5.066 |
| 5,394,196 A | * | 2/1995 | Robert | G06T 7/20 348/416.1 |
| 5,612,745 A | * | 3/1997 | Ozcelik | G06T 7/20 348/699 |
| 5,646,691 A | * | 7/1997 | Yokoyama | H04N 19/543 348/26 |
| 6,175,593 B1 | * | 1/2001 | Kim | H04N 5/145 348/699 |
| 6,212,237 B1 | * | 4/2001 | Minami | H04N 5/145 348/E5.066 |
| 6,219,436 B1 | * | 4/2001 | De Haan | G06T 7/20 356/27 |

(Continued)

FOREIGN PATENT DOCUMENTS

| | | |
|---|---|---|
| JP | 3873017 B2 | 1/2007 |
| JP | 4209647 B2 | 1/2009 |

(Continued)

*Primary Examiner* — Sath V Perungavoor
*Assistant Examiner* — Peter D Le
(74) *Attorney, Agent, or Firm* — Harness, Dickey & Pierce, P.L.C.

(57) ABSTRACT

A method of processing image data includes detecting a contour between an occlusion region and a non-occlusion region in a motion vector field of input video, generating a first contour and a second contour from the detected contour based on motion vectors of blocks corresponding to the detected contour, and separating the occlusion region into a first occlusion region adjacent to the first contour and a second occlusion region adjacent to the second contour. The method further includes reconstructing motion vectors of the first occlusion region based on motion vectors of the first contour and reconstructing motion vectors of the second occlusion region based on motion vectors of the second contour.

18 Claims, 12 Drawing Sheets

(56) References Cited

U.S. PATENT DOCUMENTS

| | | | | |
|---|---|---|---|---|
| 6,594,313 B1* | 7/2003 | Hazra | ............... | H04N 7/014 348/E7.013 |
| 6,625,333 B1* | 9/2003 | Wang | ............... | G06T 3/4007 345/606 |
| 7,088,773 B2 | 8/2006 | Paniconi et al. | | |
| 7,142,600 B1* | 11/2006 | Schonfeld | ............. | G06T 7/2006 375/240.16 |
| 7,251,364 B2 | 7/2007 | Tomita, Jr. et al. | | |
| 7,990,476 B2 | 8/2011 | Lee | | |
| 8,064,644 B2 | 11/2011 | Kokaram | | |
| 2003/0035583 A1* | 2/2003 | Pelagotti | ............... | G06T 7/2006 382/217 |
| 2004/0005084 A1* | 1/2004 | Kondo | ............... | G06T 7/2053 382/107 |
| 2004/0037471 A1 | 2/2004 | Laurent-Chatenet et al. | | |
| 2005/0129124 A1* | 6/2005 | Ha | ............... | H04N 19/513 375/240.16 |
| 2008/0095399 A1 | 4/2008 | Cui et al. | | |
| 2008/0226159 A1 | 9/2008 | Choi et al. | | |
| 2008/0317127 A1* | 12/2008 | Lee | ............... | H04N 19/61 375/240.16 |
| 2008/0317289 A1* | 12/2008 | Oyaizu | ............... | G06T 5/50 382/107 |
| 2009/0147851 A1* | 6/2009 | Klein Gunnewiek | ............. | H04N 19/513 375/240.16 |
| 2009/0213937 A1* | 8/2009 | Kawase | ............. | H04N 19/105 375/240.16 |
| 2010/0284627 A1* | 11/2010 | Lin | ............... | H04N 5/145 382/275 |
| 2011/0050993 A1* | 3/2011 | Wang | ............... | G06T 7/2013 348/452 |
| 2011/0116547 A1* | 5/2011 | Chen | ............... | G06T 3/40 375/240.16 |
| 2011/0211111 A1* | 9/2011 | Mishima | ............. | H04N 7/014 348/441 |
| 2011/0211125 A1* | 9/2011 | Petrides | ............. | H04N 19/105 348/616 |
| 2012/0033130 A1* | 2/2012 | Piek | ............... | G06T 7/2006 348/441 |

FOREIGN PATENT DOCUMENTS

| | | |
|---|---|---|
| KR | 20040078690 A | 9/2004 |
| KR | 20060121856 A | 11/2006 |
| KR | 10-0814424 | 3/2008 |
| KR | 100855976 B1 | 9/2008 |
| KR | 100924906 B1 | 11/2009 |
| KR | 20110034242 A | 4/2011 |

* cited by examiner

APPARATUS, METHOD AND VIDEO DECODER FOR RECONSTRUCTING OCCLUSION REGION

This application claims priority from Korean Patent Application No. 10-2012-0078860 filed on Jul. 19, 2012 in the Korean Intellectual Property Office, the disclosure of which is incorporated herein by reference in its entirety.

BACKGROUND

1. Field

The present disclosure relates to processing video data.

2. Description of the Related Art

Frame rate conversion is a technology for converting the number of frames per time of a moving image. In particular, frame rate up-conversion is a technology for generating an interpolated frame, which is added between temporally adjacent frames by referring to the temporally adjacent frames. The frame rate conversion technology temporally increases the resolution of an image by generating an interpolated frame between original frames using a motion estimation technique and a motion compensation technique. Thus, the frame rate conversion technology may be used to process motion blur as well as for other purposes.

An occlusion region is an object or region which exists in one of temporally adjacent first and second frames, but not in both frames. An occlusion region may be included, for example, in a frame during a video encoding process even if an image changes rapidly. An occlusion region may also be included in an interpolated frame generated by frame rate up-conversion due to the limitations of interpolation technology.

Currently, the frame rate conversion technology, and in particular frame rate up-conversion technology, is being utilized in various display systems since it can noticeably improve image quality. However, the existence of an occlusion region is pointed out as one of the limitations of the frame rate up-conversion technology.

Furthermore, if occlusion regions exist in frames of an original video having a frame rate to be up-converted, interpolated frames cannot be generated using the motion estimation technique or the motion compensation technique.

In some instances, an interpolated frame may be a new frame generated between temporally adjacent frames using motion vector information of the temporally adjacent frames. If no motion vectors exist in the temporally adjacent frames or if motion vectors existing in the temporally adjacent frames are not reliable, an interpolated frame cannot be generated and therefore the quality of video to be reproduced may be diminished.

SUMMARY

In example embodiments, an apparatus and method are provided for reconstructing an occlusion region regardless of the shape of the occlusion region and/or the direction of motion vectors around the occlusion region.

In example embodiments, an apparatus and method are provided for reconstructing an occlusion region without causing incongruity by mixing foreground vectors and background vectors around the occlusion region. However, aspects of the present embodiments are not restricted to the one set forth herein.

In accordance with an example embodiment, an apparatus for reconstructing an occlusion region comprises an occlusion detector configured to receive data corresponding to a motion vector field of a video frame and to detect an occlusion region in the motion vector field, the occlusion region corresponding to one which does not have motion vectors or has inaccurate motion vectors; a contour separator configured to detect a contour between the detected occlusion region and a non-occlusion region and to separate the detected contour into a first contour and a second contour based on motion vectors of blocks included in the detected contour; an occlusion separator configured to separate the detected occlusion region into a first occlusion region adjacent to the first contour and a second occlusion region adjacent to the second contour; and an occlusion reconstructor configured to reconstruct motion vectors of the first occlusion region based on motion vectors of the first contour and to reconstruct motion vectors of the second occlusion region based on motion vectors of the second contour.

The apparatus further includes a motion estimator configured to generate the motion vector field by comparing temporally adjacent frames of input video and providing the data corresponding to the motion vector field to the occlusion detector.

The contour separator may perform a main component analysis of the motion vector of each block included in the detected contour; generate a first main vector and a second main vector based on the analysis; and assign blocks having motion vectors represented by the first main vector to the first contour and assign blocks having motion vectors represented by the second main vector to the second contour.

The contour separator may set the motion vectors of blocks included in the first contour to the first main vector and set the motion vectors of blocks included in the second contour to the second main vector. When an area of the first contour and an area of the second contour are mixed with each other, the contour separator may calculate a difference value between adjacent motion vectors and converts the first contour into the second contour or converts the second contour into the first contour.

The occlusion reconstructor may set the motion vectors of the first occlusion region to the first main vector and sets the motion vectors of the second occlusion region to the second main vector.

The occlusion separator may set the detected occlusion region to the first occlusion region and then convert blocks included in the detected occlusion region into the second occlusion region, the conversion performed so that a sum of field discrepancy (FD) values of all blocks included in the detected occlusion region decreases or remains unchanged, an FD value of a block based on a number of neighboring blocks which are included in a different occlusion region from the occlusion region of the block. The FD value of the block may be the number of neighboring blocks in four directions, which are included in different occlusion region of the block.

The occlusion separator may perform i) a first operation of setting the detected occlusion region to the first occlusion region, preparing queues for different FD values, and assigning blocks of the detected occlusion region to the queues based on FD values of the blocks; ii) a second operation of outputting a block from a highest queue which is not empty, checking whether the output block can be converted from the first occlusion region to the second occlusion region, and converting the output block from the first occlusion region to the second occlusion region if the output block can be converted from the first occlusion region to the second occlusion region by the result of the checking; iii) a third operation of re-calculating an FD value of unprocessed blocks excluding the output block from blocks included in the detected occlusion region, the re-calculating performed when the output block is converted to the second occlusion region in the first operation, and assigning the unprocessed blocks to the queues, removing one or more of the unprocessed blocks from the queues, or moving one or more of the unprocessed blocks between queues based on the re-calculated FD value; and iv) a fourth operation of repeating the second and third operations until no blocks remain in the queues.

At least part of the motion vector field data received by the occlusion detector may comprise motion vector field data of an interpolated frame generated by frame rate up-conversion.

The apparatus may include a frame converter configured to perform frame rate up-conversion on received data corresponding to video frames having reconstructed occlusion regions from the occlusion reconstructor.

In accordance with another example embodiment, a method of reconstructing an occlusion region comprises detecting a contour between an occlusion region and a non-occlusion region in a motion vector field of input video; generating a first contour and a second contour from the detected contour based on motion vectors of blocks corresponding to the detected contour; separating the occlusion region into a first occlusion region adjacent to the first contour and a second occlusion region adjacent to the second contour; and reconstructing motion vectors of the first occlusion region based on motion vectors of the first contour and reconstructing motion vectors of the second occlusion region based on motion vectors of the second contour.

The method may further include comparing two temporally adjacent frames of input video before detecting the occlusion region; and generating data corresponding to the motion vector field based on the comparison.

The method may further include setting the motion vectors of the first occlusion region to the motion vectors of the first contour and setting the motion vectors of the second occlusion region to the motion vectors of the second contour. The occlusion region may correspond to one which does not have motion vectors or has inaccurate motion vectors.

The generating operation may include perform a main component analysis of the motion vector of each block included in the detected contour; generating a first main vector and a second main vector based on the analysis; and assigning blocks having motion vectors represented by the first main vector to the first contour and assigning blocks having motion vectors represented by the second main vector to the second contour.

The generating operation may include calculating a difference value between adjacent motion vectors; and converting the first contour into the second contour or converting the second contour into the first contour.

The method may further include generating a first main vector and a second main vector; assigning blocks having motion vectors represented by the first main vector to the first contour; and assigning blocks having motion vectors represented by the second main vector to the second contour. Generating the first and second main vectors is performed based on a covariance matrix analysis.

The method may further include up-converting a rate of video frames of the input video; and reconstructing occlusion regions in the video frames based on the up-converted rate.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
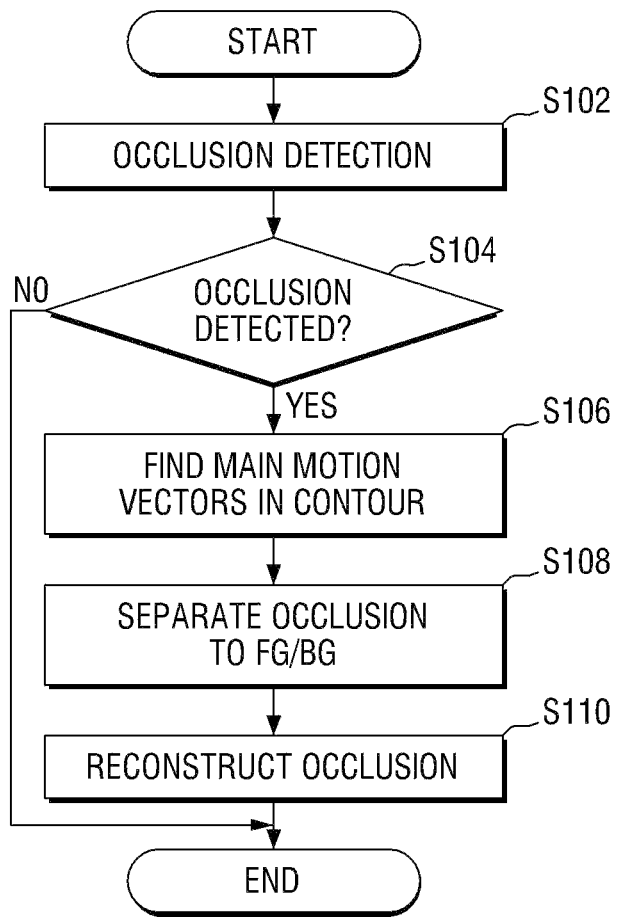
FIG. 1 is a flowchart illustrating an example embodiment of a method of reconstructing an occlusion region.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

In the drawings, it is understood that the thicknesses of layers and regions may be exaggerated for clarity. It will also be understood that when a layer is referred to as being "on" another layer or substrate, it can be directly on the other layer or substrate or intervening layers may also be present. Like reference numerals in the drawings denote like elements, and thus their description will not be repeated. As used herein, the term "and/or" includes any and all combinations of one or more of the associated listed items. Expressions such as at least one of," when preceding a list of elements, modify the entire list of elements and do not modify the individual elements of the list.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

An example embodiment of a method of reconstructing an occlusion region will now be described with reference to FIG. 1. The method of reconstructing an occlusion region according to this embodiment may include providing an image processing apparatus which includes a data input/output unit and a computation unit.

All operations in the flowchart of FIG. 1 may be performed by the image processing apparatus. Alternatively, at least one of the operations may be performed by an apparatus other than the image processing apparatus. That is, while the method of reconstructing an occlusion region according to the current embodiment includes providing the image processing apparatus, not all operations included in the method should be performed by the image processing apparatus. For ease of description, however, it is assumed in the present specification that all operations illustrated in FIG. 1 are performed by the image processing apparatus.

The image processing apparatus may generate data about a motion vector field by comparing temporally adjacent (or successive) frames in an input video. Alternatively, instead of performing this comparing operation, the image processing apparatus may receive data about the motion vector field.

Then, the image processing apparatus detects an occlusion region, which does not have motion vectors or has inaccurate motion vectors, in the motion vector field (S102). The occlusion region can be detected using methods disclosed in many documents including, for example, the method disclosed in Korean Patent Registration No. 0814424, the contents of which is incorporated by reference in its entirety.

When the occlusion region is detected (S104), two main motion vectors (that is, a first main vector and a second main vector) are found among motion vectors of unit blocks included in a contour which surrounds the detected occlusion region (S106). The first and second main vectors are two vectors which can represent the motion vectors of the unit blocks included in the contour. The first and second main vectors can be found by using, for example, a statistical method. One type of statistical method for this purpose involves performing a principal component analysis, for the motion vectors of every unit blocks in the contour.

Next, the contour is separated into a first contour and a second contour based on a similarity between the motion vector of each unit block of the contour and the first and second main vectors.

The detected occlusion region is separated into a first occlusion region adjacent to the first contour and a second occlusion region adjacent to the second contour (S108).

Then, motion vectors of the first occlusion region are reconstructed using motion vectors of the first contour, and motion vectors of the second occlusion region are reconstructed using motion vectors of the second contour (S110). More specifically, according to one example embodiment, reconstructing the motion vectors of the first and second occlusion regions (S110) may involve setting the motion vectors of the first occlusion region to the motion vectors of the first contour and setting the motion vectors of the second occlusion region to the motion vectors of the second contour.

The series of operations illustrated in FIG. 1 may be performed on frames of an input video with an up-converted frame rate. Frame rate up-conversion and video decoding may also be performed by the image processing apparatus. That is, according to the current example embodiment, reconstructing the occlusion region may involve reconstructing an occlusion region included in each video frame of an input video with an up-converted frame rate. The frame rate up-conversion may be performed using techniques disclosed in many documents including, for example, Korean Patent Registration No. 0467625, the contents of which is incorporated herein by reference in its entirety. (The term 'decoding,' as used herein may include obtaining data about at least each frame by parsing encoded video data; however, this parsing technique is not to be held limiting to all embodiments).

Figure 2:
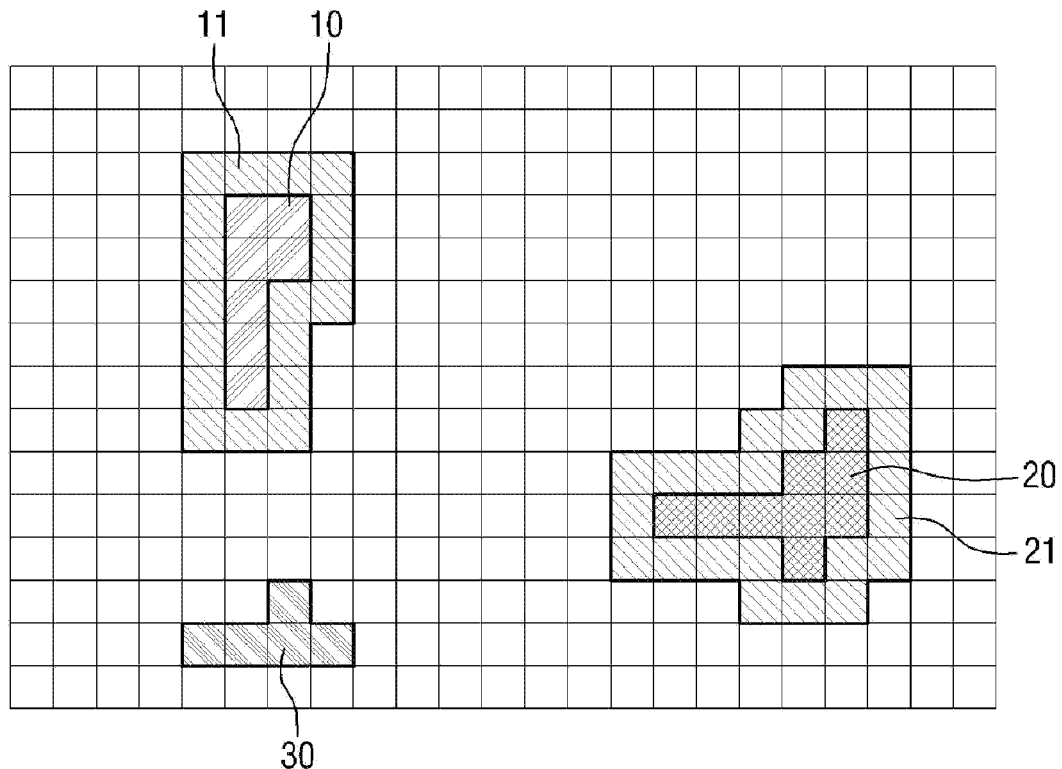
FIG. 2 is a conceptual diagram of frame data having occlusion regions.

According to an example embodiment, after occlusion regions in frames of a video are reconstructed (or otherwise identified) through the series of operations in FIG. 1, the frame rate up-conversion may be performed on the video. This example embodiment will now be described using examples and with reference to FIGS. 2 through 6F. FIG. 2 shows an example of frame data having, in this case, multiple occlusion regions 10 and 20. In this diagram, each square region of a grid shown in FIG. 2 may denote one block. The block may be a pixel (or sub-pixel) set for a region and may be given one motion vector.

Also, in FIG. 2, a foreground region 30 is shown and contours 11 and 21 are shown to respectively surround the occlusion regions 10 and 20. The contours 11 and 21 are blocks which surround the occlusion regions 10 and 20 and may have a thickness of one block or more. Each block included in an occlusion region has a noise value or does not have a motion vector, or both. In one case, each block included in a contour that surrounds the occlusion region may have a motion vector.

Figure 3:
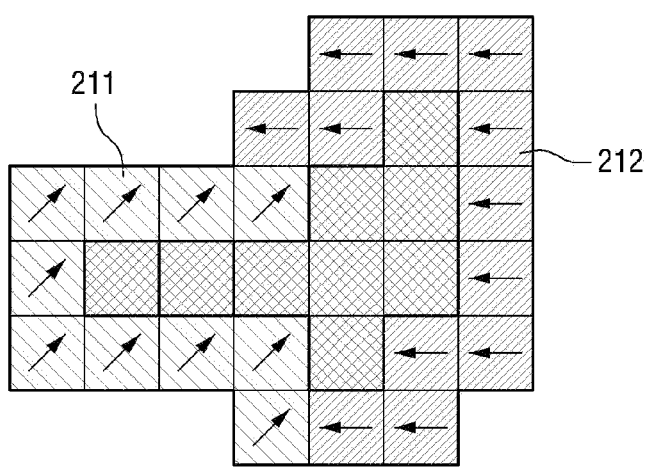
FIG. 3 is a conceptual diagram illustrating an example case where a contour around an occlusion region is separated into two contours.

FIG. 3 is a conceptual diagram illustrating an example case where a contour around an occlusion region is separated into two contours. In FIG. 3, an enlarged view of the occlusion region 20 of FIG. 2 is shown. Although a motion vector of each block included in a contour is not shown in FIG. 2, it is shown in FIG. 3.

According to an example, blocks in a contour may be classified into first blocks or second blocks according to the direction of motion vectors. As shown in the example of FIG. 3, a first number of blocks form a first contour 211 and a second number of blocks form a second contour 212.

The motion vectors in the contour cannot always be classified into exactly two directions as shown in FIG. 3. Therefore, the image processing apparatus may perform a main component analysis of the motion vector of each block included in the contour using, for example, a covariance matrix. A first main vector and a second vector may then be generated based on the analysis. Blocks having motion vectors represented by the first main vector is shown in the first contour 211, and blocks having motion vectors represented by the second main vector are shown in the second contour 212.

Figure 4:
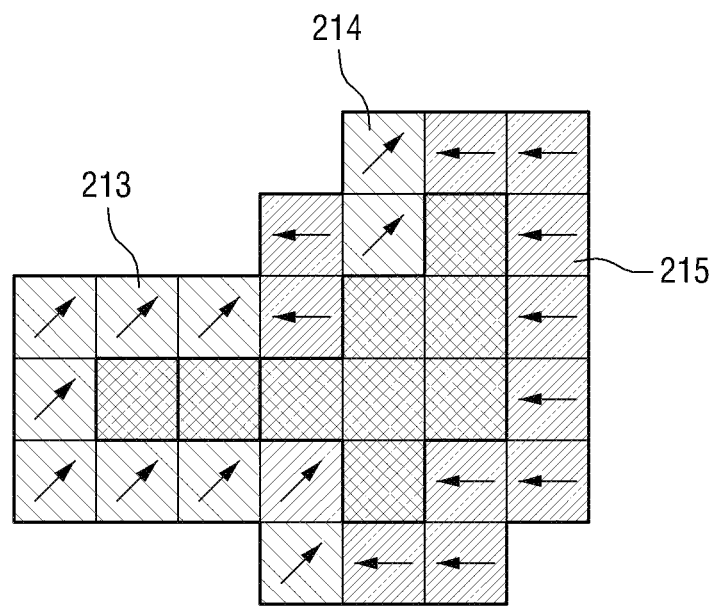
FIGS. 4 and 5 are conceptual diagrams illustrating an example case where a contour around an occlusion region is separated into two contours.

According to an example shown in FIG. 4, the contour may be separated into a first contour 213 and a second contour 215. However, the contour may also include a region 214 between the first contour 213 and the second contour 215. In FIG. 3, the blocks of the first and second contours are shown as being consecutive or contiguous. However, in alternative embodiments such as shown in FIG. 4, a contour may not be contiguous or different contours having the same main vector may be discontinuously arranged around an occlusion region.

Figure 5:
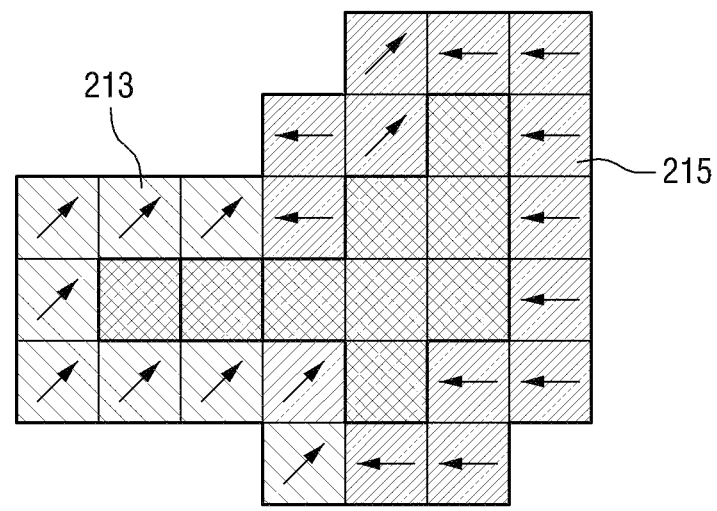

Here, the image processing apparatus may compute a difference value between every two adjacent motion vectors and may convert the first contour 213 into the second contour 215 or convert the second contour 215 into the first contour 213 such that the sum of difference values for the entire contour becomes minimum. That is, the first contour 213 and the second contour 215 may be adjusted as shown in FIG. 5.

Here, the image processing apparatus may compute a point indicated by an average vector of motion vectors that belong to the first contour 213 and a point indicated by an average vector of motion vectors that belong to the second contour 215. Then, the image processing apparatus may determine whether to include the region 214 in the first contour 213 or the second contour 215 based on a distance between the region 214 and the point indicated by each of or one or more of the average vectors. Additionally, or alternatively, in the case where region 214 is between two blocks having a different main motion vector, region 214 (which may include one or more blocks) may be converted or assigned to the contour corresponding to the two blocks.

Until now, a case where a contour formed around an occlusion region is separated into two contours based on its motion vectors has been described with reference to FIGS. 3 through 5. The occlusion region may also be separated into two occlusion regions in accordance with the separation of the contour.

Figure 6A:
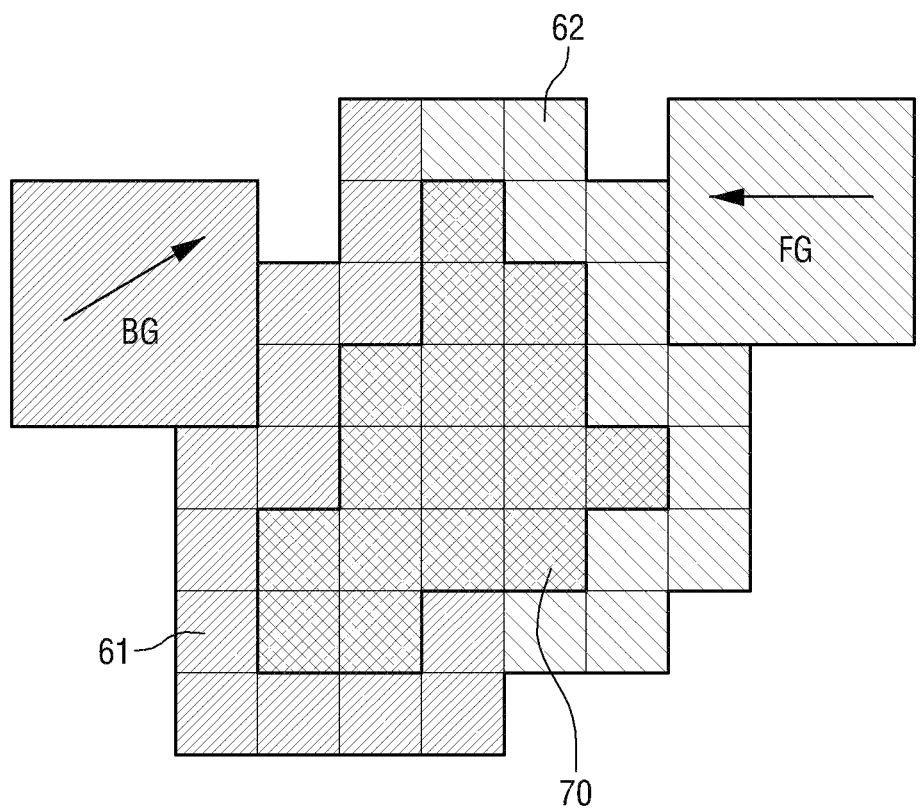
FIGS. 6A through 6F are conceptual diagrams illustrating an example embodiment of a process of separating an occlusion region into two occlusion regions and reconstructing the occlusion regions.

An example embodiment of a process of separating an occlusion region will now be described with reference to FIGS. 6A through 6E. In FIG. 6A, a first contour 61, a second contour 62, and an occlusion region 70 are shown. Referring to FIG. 6A, the first contour 61 is adjacent to a background BG and the second contour is adjacent to a foreground FG. It is assumed that motion vectors of the first contour 61 are identical to motion vectors of the background BG and that motion vectors of the second contour 62 are identical to motion vectors of the foreground FG.

In the method and apparatus for reconstructing an occlusion region according to the present example embodiment, a data conversion process from FIG. 6A to 6E may be performed in order to separate the occlusion region 70 into a first occlusion region adjacent to the first contour 61 and a second occlusion region adjacent to the second contour 62. The first contour 61 and the first occlusion region may be homogeneous, and the second contour 62 and the second occlusion region may also be homogeneous.

However, in other example embodiments, the first contour 61 and the second occlusion region, the second contour 62 and the first occlusion region, and/or the first occlusion region and the second occlusion region may be heterogeneous. The term 'heterogeneous,' as used herein, denotes that the directions of motion vectors are different (e.g., exceed a certain difference angle or threshold) and the term 'homogeneous,' as used herein, denotes that the directions of the motion vectors are the same or similar (e.g., are less than the certain difference angle or threshold).

Figure 6B:
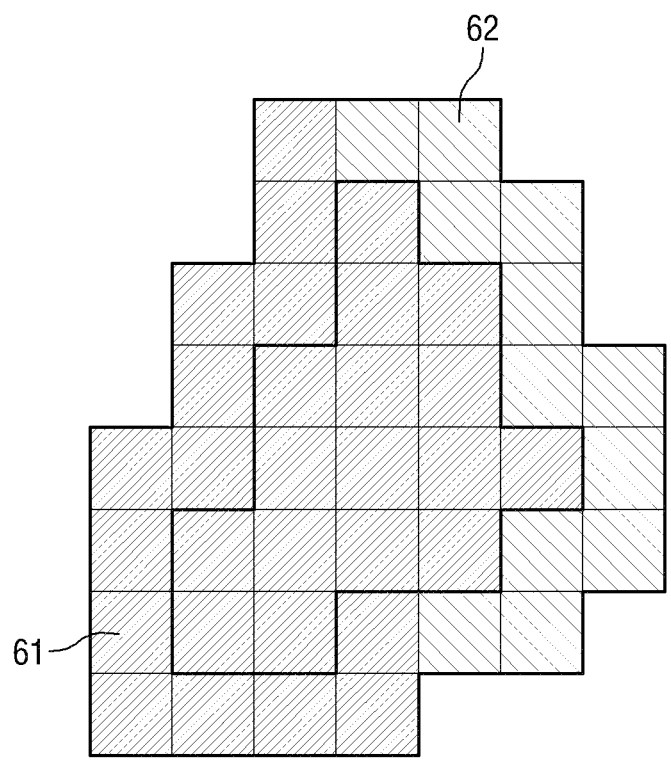

Referring to FIG. 6B, the entire occlusion region 70 may initially be set to the first occlusion region. That is, the entire occlusion region 70 may be set to the background BG in FIG. 6B. Alternatively, unlike FIG. 6B, the entire occlusion region 70 can also be set to the foreground FG. Whether or not the entire occlusion region is set to FG or BG may be determined, for example, based on the number of blocks in contours 61 or 62 (e.g., which one has more blocks), the extent which either contour surrounds the occlusion region (e.g., which one has a greater coverage area), or based on another criteria.

Then, a field discrepancy (FD) value of each block included in the occlusion region 70 may be calculated. The FD value of a block may correspond to the number of neighboring blocks which are included in a different occlusion region from the occlusion region of the block. For example, the FD value may be calculated for neighboring blocks in four (up, down, left and right) directions. In this case, the FD value may have a value of 0 to 4.

When neighboring blocks in four diagonal directions are taken into consideration in addition to the neighboring blocks in the up, down, left and right directions, the FD value may have a value of 0 to 8. In other embodiments different types or numbers of directions may be used. Hereinafter, an example embodiment is discussed in which the FD value lies in a range of 0 to 4; on that is, first through fourth queues to which blocks with FD values of 1 to 4 are input respectively.

In an example embodiment, a hierarchy may exist among the first through fourth queues. It may be assumed, for example, that the fourth queue is higher than the third queue in the hierarchy, the third queue is higher than the second queue, and the second queue is higher than the first queue. The hierarchy of the first through fourth queues may be one used to convert a block surrounded by a greater number of heterogeneous neighboring blocks between the first occlusion region and the second occlusion region before other blocks and to output and process blocks input to a high ranking queue.

All or a portion of the blocks included in the occlusion region 70 may be input (or assigned) to one of the first through fourth queues according to the FD value thereof. A case where not all the blocks in the occlusion region 70 are assigned a value of 1 to 4 includes when a block having FD value of zero is not input into any of the queues.

The blocks input to the first through fourth queues are output one by one from a highest queue which is not empty. An output block is converted into the second occlusion region when the sum of FD values of all (or a certain number less than all the) blocks included in the occlusion region 70 and FD values of all (or a certain number less than all) of the blocks included in the entire contour (61 and 62) surrounding the occlusion region 70 decreases or remains unchanged. If the sum of the FD values of all (or the certain number of) blocks included in the occlusion region 70 and the FD values of all (or a certain number of) blocks included in the first and second contours 61 and 62 increases as a result of converting the output block from the first occlusion region to the second occlusion region, the output block may not be converted into the second occlusion region.

According to an example embodiment, an output block may be converted into the second occlusion region only when the sum of the FD values of all or the certain number of) blocks included in the occlusion region 70 and the FD values of all (or the certain number of) blocks included in the entire contour surrounding the occlusion region 70 decreases.

In the present embodiment, it may be assumed that an output block is converted into the second occlusion region when the sum of the FD values of all (or the certain number of) blocks included in the occlusion region 70 and the FD values of all (or the certain number of) blocks included in the entire contour does not increase.

Figure 6C:
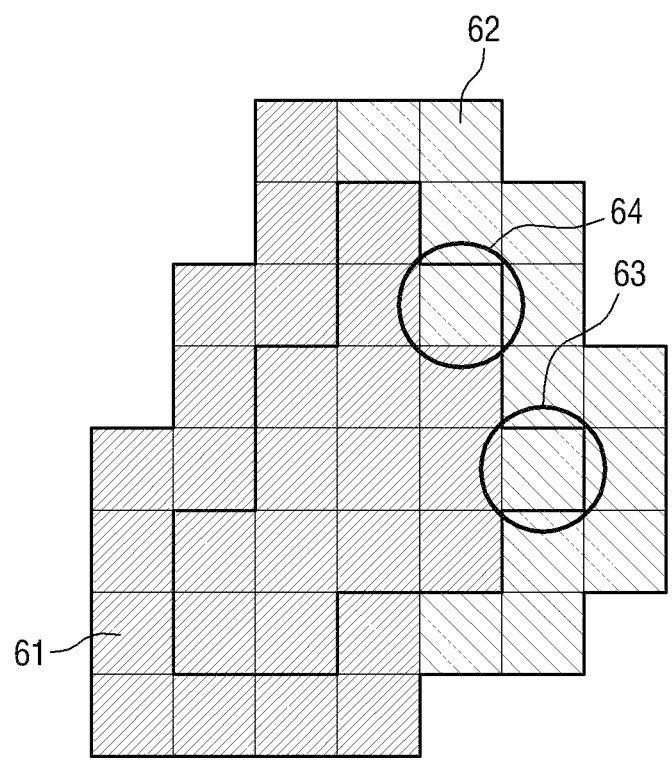

An example operation of outputting blocks input to each queue will now be described in more detail with reference to FIGS. 6C and 6D. In FIG. 6C, a first block 64 was originally in the first occlusion region. When the first block 64 was the first occlusion region, its FD value was two. Therefore, it can be understood that the first block 64 was output from the second queue.

After the first block 64 is output from the second queue, it can be converted into the second occlusion region. Blocks whose FD values are affected when the first block 64 is converted from the first occlusion region to the second occlusion region are the first block 64 itself and blocks located above, below, to the left, and to the right of the first block 64.

More specifically, while the FD value of the first block 64 remains unchanged, the FD values of the blocks located above and to the right of the first block 64 are reduced by one, and the blocks located below and to the left of the first block 64 are increased by one. Therefore, even if the first block 64 is converted into the second occlusion region, the sum of the FD values of the occlusion region 70 and the entire contour 61 and 62 remains unchanged. Accordingly, the first block 64 can be converted into the second occlusion region.

A second block 63 can also be converted into the second occlusion region. Specifically, when the second block 63 is converted from the first occlusion region to the second occlusion region, its FD value is reduced from three to one. In addition, FD values of blocks located above, to the right and to the left of the second block 63 are also reduced by one. However, an FD value of a block located to the left of the second block 63 is increased by one. Therefore, when the second block 63 is converted from the first occlusion region to the second occlusion region, the sum of the FD values of the occlusion region 70 and the entire contour 61 and 62 decreases. Accordingly, the second block 63 can be converted into the second occlusion region after being output from a queue.

Figure 6D:
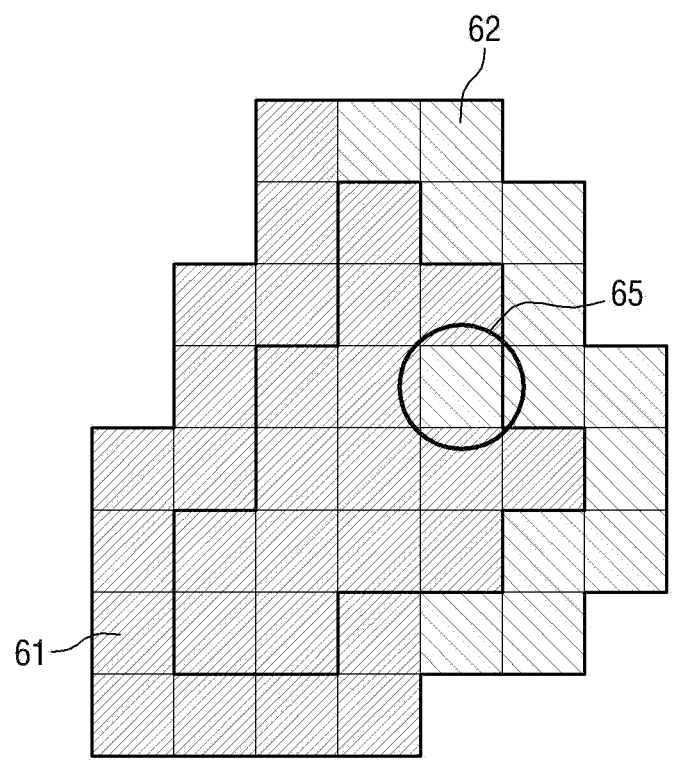

When a third block 65 shown in FIG. 6D is converted into the second occlusion region, its FD value increases to three, and FD values of blocks located above, to the left and to the right of the third block 65 also increase. Therefore, when the third block 65 is converted into the second occlusion region, the sum of the FD values of all (or a certain number less than all the) blocks included in the occlusion region 70 and the entire contour 61 and 62 increases. Accordingly, the third block 65 can be converted into the second occlusion region after being output from a queue.

As described above, blocks are output one by one from the first through fourth queues. Whenever an output block is converted from the first occlusion region to the second occlusion region, an FD value of each of unprocessed blocks (i.e., blocks excluding the output block from all blocks included in the occlusion region 70) is calculated again.

Then, each of the unprocessed blocks is removed from a queue (when the FD value becomes zero), moved to another queue (when the FD value is changed), or input to a queue (when the FD value is changed from zero to a value other than zero) based on the recalculation result.

A block removed from a queue based on the recalculation result and a block output from the queue may be processed differently. Therefore, the removed block may be included in those blocks whose FD values are to be calculated again. That is, a block output from a queue and checked whether it can be converted from the first occlusion region to the second occlusion region is a block which has already been determined to be allocated to the first occlusion region or the second occlusion region.

Thus, the output block is not input again to the queue. However, a block removed from a queue, since its FD value changed to zero when another block was converted into the second occlusion region, may be input again to the queue if its FD value changes again to a value other than zero when another block is converted into the second occlusion region.

Next, a block is output from a highest queue which is not empty and is then checked whether it can be converted from the first occlusion region to the second occlusion region. If the output block can be converted into the second occlusion region, it is converted from the first occlusion region to the second occlusion region.

When the output block is converted into the second occlusion region, the FD value of each of the unprocessed blocks is calculated again. If the FD value of each of the unprocessed blocks is changed, an update operation (i.e., inputting each of the unprocessed blocks to a queue, removing the unprocessed block from a queue, or moving the unprocessed block between queues) is repeated until all queues become empty.

Figure 6E:
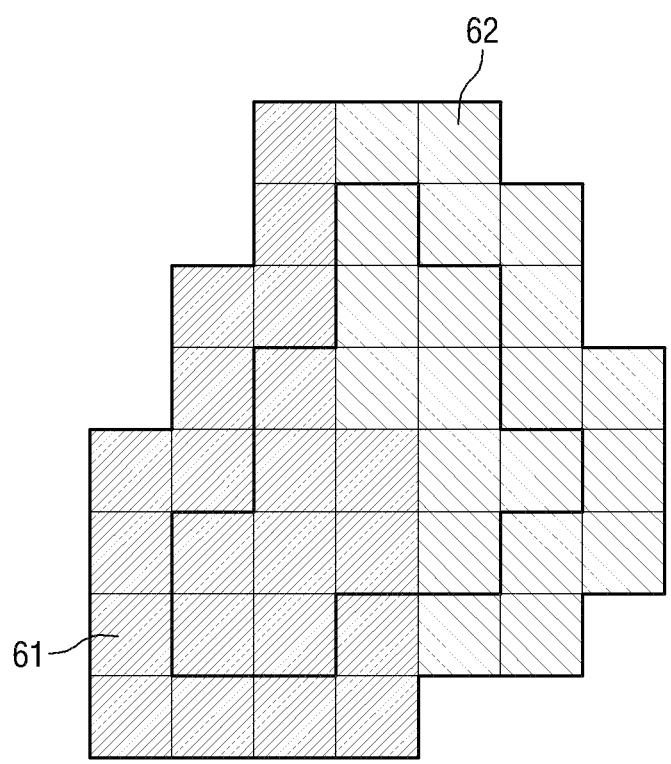

FIG. 6E shows the occlusion region 70 separated into the first and second occlusion regions through the above process. Referring to FIG. 6E, the first occlusion region is adjacent to the first contour 61, and the second occlusion region is adjacent to the second contour 62.

As previously described, an occlusion region may correspond to a region without motion vectors and/or a region filled only with noise vectors. In other embodiments, an occlusion region may correspond to a region with error vectors or values (e.g., pixels or sub-pixels) or a region with another anomalous condition.

Figure 6F:
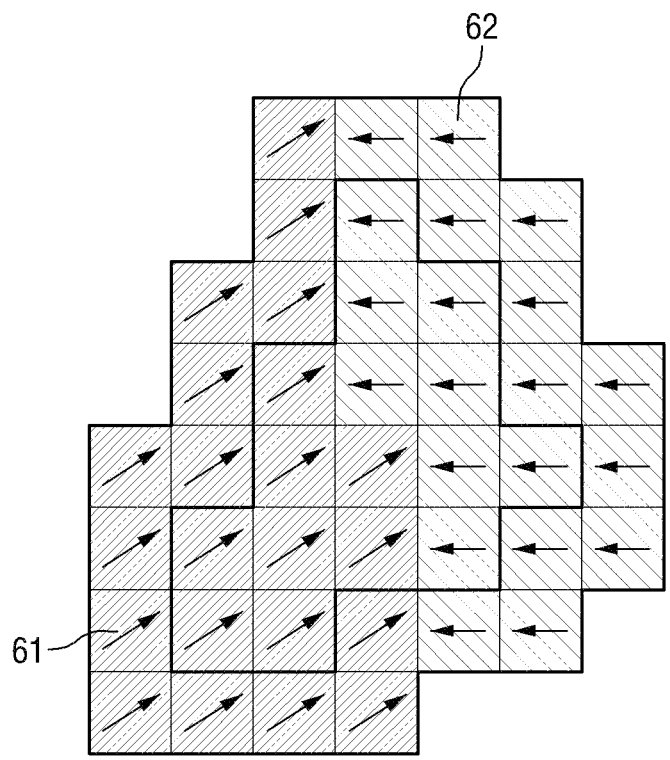

FIG. 6F shows the result of reconstructing motion vectors of the separated occlusion region 70 in accordance with the present embodiment. Referring to FIG. 6F, motion vectors of the first occlusion region are set to the motion vectors of the first contour 61, and motion vectors of the second occlusion region are set to the motion vectors of the second contour 62. Therefore, it can be understood that motion vectors of an occlusion region can be reconstructed using motion vectors of a contour surrounding the occlusion region.

An occlusion region can therefore be reconstructed regardless of a shape of the occlusion region and/or a direction of motion vectors around or adjacent the occlusion region. In addition, in accordance with an example embodiment, when the occlusion region is reconstructed, motion vectors of a first contour and motion vectors of a second contour may not be mixed. Instead, the motion vectors of the first contour and the motion vectors of the second contour may be used separately. That is, different motion vectors of the occlusion region may be assigned to the motion vector of the first contour and the motion vector of the second contour. This can prevent incongruity caused by the reconstruction of the occlusion region.

A configuration and operation of an apparatus 200 for reconstructing an occlusion region according to an example embodiment will now be described with reference to FIG. 7.

Figure 7:
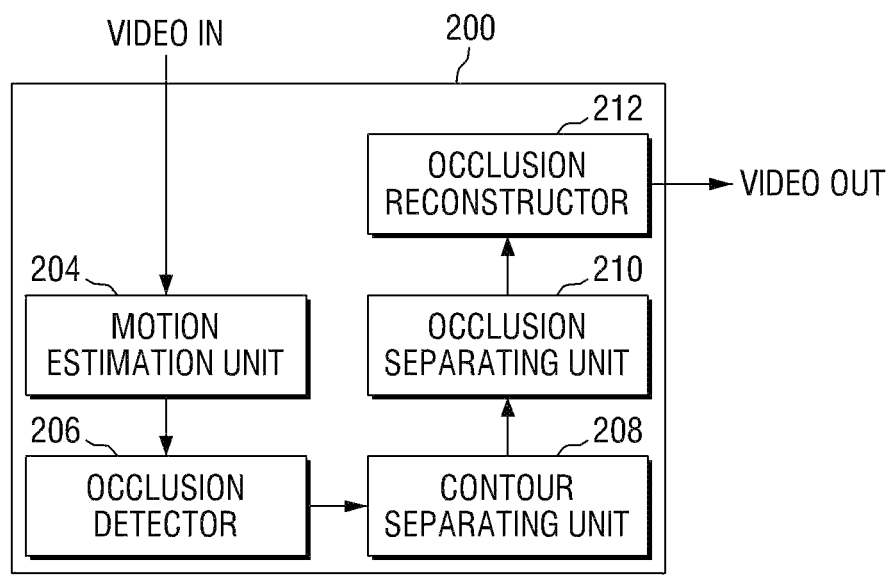
FIG. 7 is a block diagram of an example embodiment of an apparatus for reconstructing an occlusion region.

Each block of FIG. 7 can be implemented by computer program instructions, a hardware circuit, or a combination thereof. The computer program instructions can be provided to a processor of a general purpose computer, special purpose computer, or other programmable data processing apparatus. The instructions, which may be executed by the processor of the computer or other programmable data processing apparatus, may implement all or a portion of the functions specified in the flowchart block or blocks.

Moreover, the computer program instructions may be stored in a computer usable or computer-readable memory that can direct a computer or other programmable data processing apparatus to function in a particular manner. The instructions stored in the computer usable or computer-readable memory may therefore correspond to an article of manufacture that implements all or a portion of the functions specified in the flowchart block or blocks.

Moreover, the computer program instructions may be loaded onto a computer or other programmable data processing apparatus to cause a series of operations to be performed on the computer or other programmable apparatus to produce a computer implemented process. The instructions executed on the computer or other programmable apparatus may therefore correspond to operations for implementing all or a portion of the functions specified in the flowchart block or blocks.

Moreover, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'unit', as used herein, may correspond to, but is not limited to, a software or hardware component such as a Field Programmable Gate Array (FPGA), Application Specific Integrated Circuit (ASIC), a system semiconductor or a system-on-chip, which performs certain tasks.

A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Referring to FIG. 7, the apparatus 200 for reconstructing an occlusion region may include an occlusion detector 206, a contour separating unit 208, an occlusion separating unit 210, and an occlusion reconstructor 212. The apparatus 200 may further include a motion estimation unit 204.

The occlusion detector 206 receives data about a motion vector field of a video frame and detects an occlusion region, which does not have motion vectors or has inaccurate motion vectors, in the motion vector field.

The motion estimation unit 204 may receive data about each frame of an input video, generate the motion vector field by comparing every two temporally adjacent frames of the input video, and provide the data about the motion vector field to the occlusion detector 206.

The motion estimation unit 204 may generate preceding motion vectors by comparing each frame of the input video with a preceding frame and generate following motion vectors by comparing each frame of the input video with a following frame. Then, the motion estimation unit 204 may combine the preceding motion vectors and the following motion vectors to generate the motion vector field.

The contour separating unit 208 detects a contour between the detected occlusion region and a non-occlusion region and separates the detected contour into a first contour and a second contour based on a motion vector of each block included in the detected contour.

According to an example embodiment, the contour separating unit 208 may perform a main component analysis of the motion vector of each block included in the detected contour using a covariance matrix, generate a first main vector and a second main vector through the analysis, and include blocks having motion vectors represented by the first main vector in the first contour and include blocks having motion vectors represented by the second main vector in the second contour.

According to an example embodiment, the contour separating unit 208 may set motion vectors of the blocks included in the first contour to the first main vector and set motion vectors of the blocks included in the second contour to the second main vector.

According to an example embodiment, when the area of the first contour and the area of the second contour are mixed with each other, the contour separating unit 208 may calculate a difference value between every two adjacent motion vectors and convert the first contour into the second contour or convert the second contour into the first contour such that the sum of difference values for the entire contour becomes minimum.

The occlusion separating unit 210 separates the detected occlusion region into a first occlusion region adjacent to the first contour and a second occlusion region adjacent to the second contour.

According to an example embodiment, the occlusion separating unit 210 may initially set the detected occlusion region to the first occlusion region. Then, the occlusion separating unit 210 may convert blocks included in the detected occlusion region into the second occlusion region one by one, such that the sum of FD values of all (or a certain number of) blocks included in the detected occlusion region decreases or remains unchanged.

Here, an FD value of a block is the number of neighboring blocks that are included in different occlusion region from the occlusion region of the block. The FD value of the block may be the number of neighboring blocks in four directions, which are included in different occlusion region from the occlusion region of the block, and may be any one of 0 to 4.

According to an example embodiment, the occlusion separating unit 210 may perform an initial operation of setting the detected occlusion region to the first occlusion region, preparing first through fourth queues to which blocks having FD values of 1 to 4 are input respectively, and inputting blocks having FD values other than zero among the blocks of the detected occlusion region to the first through fourth queues according to the FD values of the blocks; a first operation of outputting one block from a highest queue which is not empty, checking whether the output block can be converted from the first occlusion region to the second occlusion region, and converting the output block from the first occlusion region to the second occlusion region if the output block can be converted from the first occlusion region to the second occlusion region; a second operation of re-calculating an FD value of each of unprocessed blocks, which are blocks excluding the output block from all blocks included in the detected occlusion region, when the output block is converted into the second occlusion region and inputting each of the unprocessed blocks to a queue, removing each of the unprocessed blocks from a queue, or moving each of the unprocessed blocks between queues when the FD value is changed;

and a third operation of repeating the first and second operations until no blocks input to the first through fourth queues are left.

The occlusion reconstructor 212 reconstructs motion vectors of the first occlusion region using motion vectors of the first contour and reconstructs motion vectors of the second occlusion region using motion vectors of the second contour.

According to an example embodiment, the occlusion reconstructor 212 sets the motion vectors of the first occlusion region to the first main vector and sets the motion vectors of the second occlusion region to the second main vector.

According to an example embodiment, the apparatus 200 may include a frame rate converter. Here, the apparatus 200 may perform frame rate up-conversion before reconstructing the detected occlusion region or after reconstructing the detected occlusion region. That is, at least part of the motion vector field data received by the occlusion detector 206 may include the motion vector field data of an interpolated frame generated by frame rate up-conversion. Alternatively, the apparatus 200 may further include a frame converter (not shown) which receives from the occlusion reconstructor 212 data about video frames having reconstructed occlusion regions and performs frame rate up-conversion on the received data.

Figure 8:
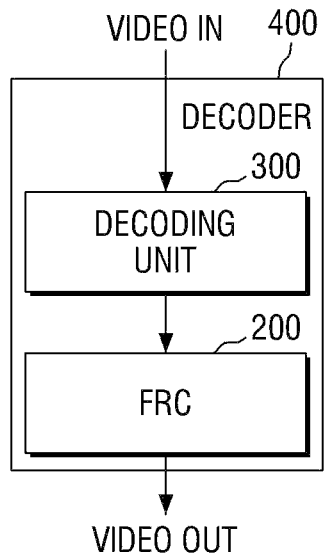
FIG. 8 is a block diagram of an example embodiment of a decoder.

FIG. 8 is a block diagram of an example embodiment of a decoder 400 which includes a decoding unit 300 and a frame rate converter 200. The decoding unit 300 generates original frame data by decoding an input video and provides the original frame data to the frame rate converter 200.

The frame rate converter 200 receives the original frame data and generates converted frame data by adding an interpolated frame between at least some frames.

The frame rate converter 200 may reconstruct an occlusion region. The frame rate converter 200 may generate a motion vector field for the conversion frame data, detect an occlusion region, which does not have motion vectors or has inaccurate motion vectors, in the motion vector field, detect a contour between the detected occlusion region and a non-occlusion region, separate the detected contour into a first contour and a second contour based on a motion vector of each block included in the detected contour, separate the detected occlusion region into a first occlusion region adjacent to the first contour and a second occlusion region adjacent to the second contour, and reconstruct motion vectors of the first occlusion region using motion vectors of the first contour and reconstruct motion vectors of the second occlusion region using motion vectors of the second contour.

Figure 9:
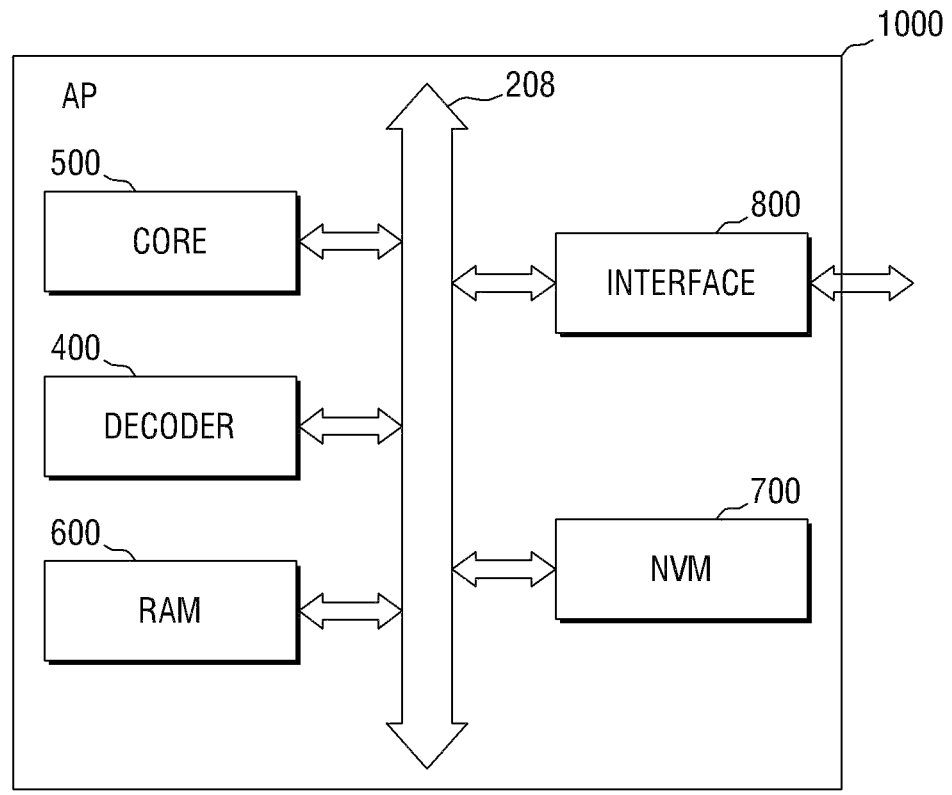
FIG. 9 is a block diagram of an example embodiment of an application processor.

An application processor 1000 according to an example embodiment of the present invention will now be described with reference to FIG. 9. Referring to FIG. 9, the application processor 1000 according to the current embodiment may include an interface 800, a decoder 400, and a core 500. The application processor 1000 may further include a random access memory (RAM) 600, a nonvolatile memory 700, and an internal data path 450.

The interface 800 may be connected to an external device (not shown) and receive/send video data from/to the external device.

The decoder 400 is the decoder 400 described above with reference to FIG. 8. The core 500 executes an instruction set stored in the RAM 600. The core 500 may control the interface 800 and the decoder 400 by executing the instruction set. The application processor 1000 according to the current embodiment can be implemented as a system-on-chip.

Figure 10:
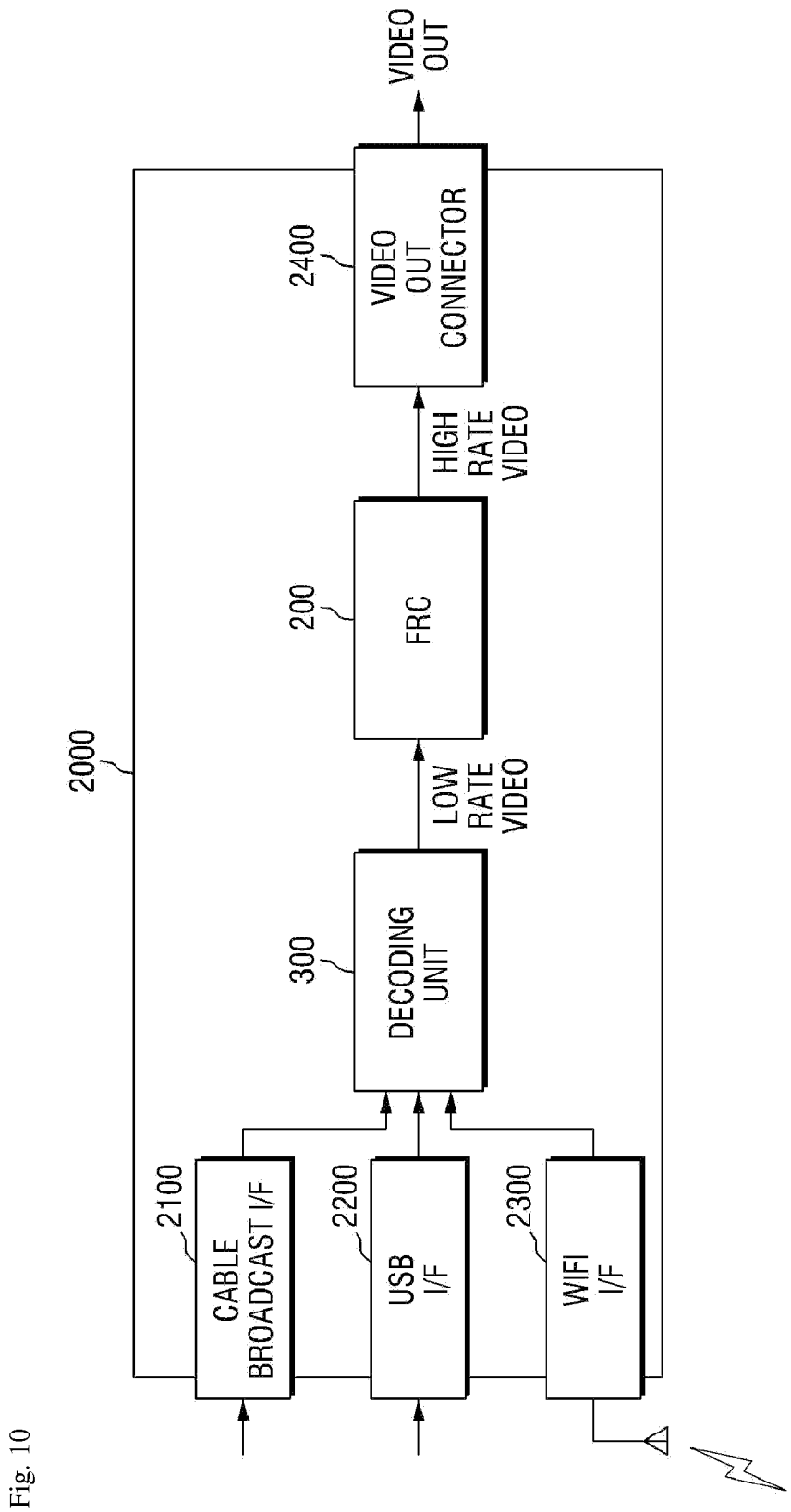
FIG. 10 is a diagram illustrating an example embodiment of a video processing apparatus.

FIG. 10 is a diagram illustrating an example embodiment of a configuration of a video processing apparatus 2000. Referring to FIG. 10, the video processing apparatus 2000 includes a decoding unit 300 which decodes video data and a frame rate converter 200. The operations of the decoding unit 300 and the frame rate converter 200 have been described above with reference to FIGS. 7 and 8. The decoding unit 300 may receive video data from at least one of a cable broadcast interface 2100, a USB interface 2200, and a WIFI interface 2300.

Video data output from the decoding unit 300 may have a low frame rate. The low frame rate of the video data is converted into a high frame rate by the frame rate converter 200. The video data that passes through the frame rate converter 200 is provided to an external display device via a video out connector 2400. The video processing apparatus 2000 shown in FIG. 10 may be, for example, a set-top box, a vehicle black box, or a digital moving image player.

Figure 11:
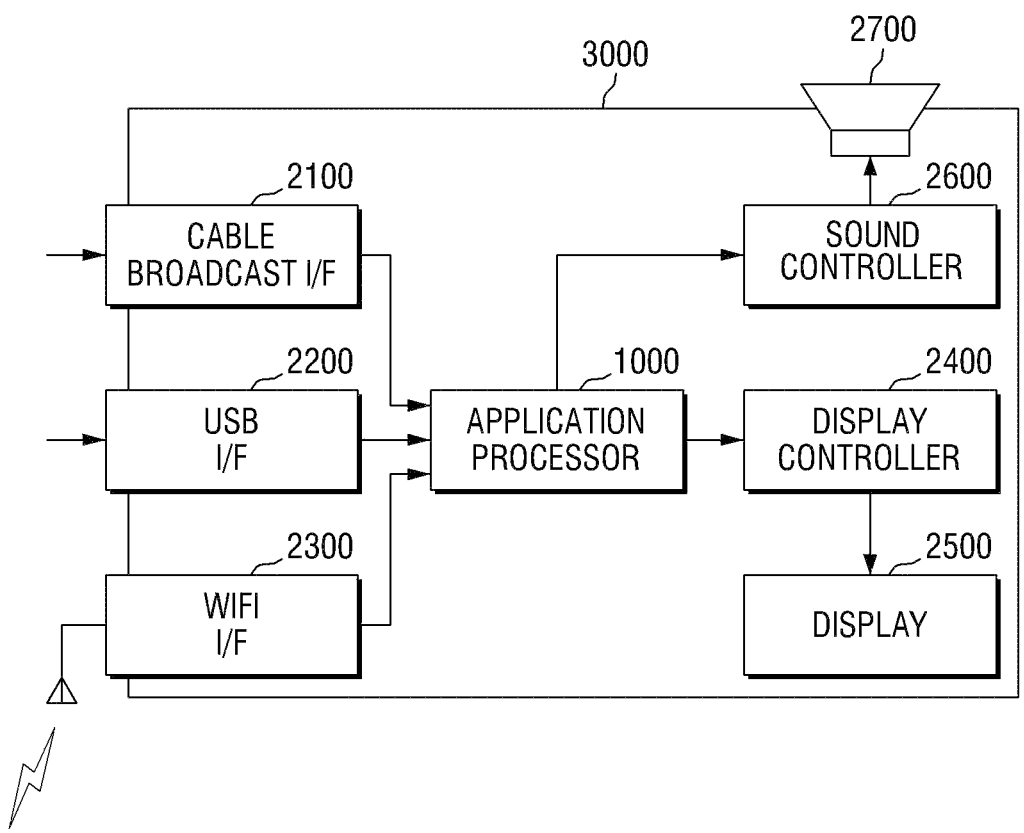
FIG. 11 is a diagram illustrating an example embodiment of a video processing apparatus.

FIG. 11 is a diagram illustrating another example embodiment of a configuration of a video processing apparatus 3000. Referring to FIG. 11, the video processing apparatus 3000 includes an application processor 1000 which converts a frame rate and reconstructs an occlusion region. Thus, the video processing apparatus 3000 can up-convert even the frame rate of video data compressed at a high compression rate when decoding the video data. Since an occlusion region can be reconstructed despite the frame rate up-conversion, a high-quality video can be played on a display 2500.

The application processor 1000 may receive video data from at least one of a cable broadcast interface 2100, a USB interface 2200, and a WIFI interface 2300. The video data with an up-converted frame rate is output from the application processor 1000 and provided to the display 2500 via a display controller 2400.

In addition, sound data output from the application processor 1000 is provided to a speaker 2700 via a sound controller 2600. The video processing apparatus 3000 according to the current embodiment may be, for example, a TV, a monitor, a table PC, a notebook, or a wireless mobile terminal.

According to example embodiments, an occlusion region can be reconstructed regardless of the shape of the occlusion region and the direction of motion vectors around the occlusion region. In addition, since foreground vectors and background vectors around an occlusion region are mixed, incongruity caused by the reconstruction of the occlusion region can be prevented.

Also, an occlusion region in an interpolated frame generated by frame rate up-conversion can be reconstructed robustly as mentioned above. This can prevent screen damage which may occur irregularly after the frame rate up-conversion, thus allowing the frame rate up-conversion technology to be utilized more widely.

Furthermore, in the process of decoding a video compressed at a high compression rate, frame rate up-conversion can be performed after an occlusion region which may be included in a frame rate is reconstructed. Therefore, smooth screen change can be provided even for a video compressed at a high compression rate.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An apparatus for reconstructing an occlusion region, comprising:
    a memory having computer readable instructions stored thereon; and at least one processor configured to execute the computer readable instructions to,
receive data corresponding to a motion vector field of a video frame,
detect an occlusion region in the motion vector field, the occlusion region corresponding to a portion of the motion vector field not having motion vectors or having inaccurate motion vectors,
detect a contour between the detected occlusion region and a non-occlusion region,
separate the detected contour into a first contour and a second contour based on motion vectors of blocks included in the detected contour,
separate the detected occlusion region into a first occlusion region and a second occlusion region, the first occlusion region adjacent to the first contour, and the second occlusion region adjacent to the second contour,
reconstruct motion vectors of the first occlusion region based on motion vectors of the first contour,
reconstruct motion vectors of the second occlusion region based on motion vectors of the second contour,
set the detected occlusion region to the first occlusion region, and
convert blocks included in the first occlusion region into the second occlusion region, such that a sum of field discrepancy (FD) values of blocks included in the detected occlusion region decreases or remains unchanged, an FD value of at least one of block in the detected occlusion region is based on a number of neighboring blocks which are included in a different occlusion region from the occlusion region of the at least one block,
wherein the FD value of the at least one block is the number of blocks neighboring in four directions, which are included in different occlusion region of the at least one block.

2. The apparatus of claim 1, wherein the processor is further configured to,
generate the motion vector field by comparing temporally adjacent frames of an input video, and
provide the data corresponding to the motion vector field.

3. The apparatus of claim 1, wherein the processor is further configured to,
perform a main component analysis of the motion vectors of blocks included in the detected contour,
generate a first main vector and a second main vector based on the main component analysis,
assign blocks having motion vectors represented by a first main vector to the first contour, and
assign blocks having motion vectors represented by a second main vector to the second contour.

4. The apparatus of claim 3, wherein the processor is further configured to,
set the motion vectors of the first contour to the first main vector, and
set the motion vectors of the second contour to the second main vector.

5. The apparatus of claim 4, wherein the processor is further configured to,
determine whether an area of the first contour and an area of the second contour are mixed with each other, and
calculate a difference value between the motion vectors of blocks in the first contour and the second contour that are adjacent to each other, and convert the first contour into the second contour or convert the second contour into the first contour based on the determination.

6. The apparatus of claim 3, wherein the processor is further configured to,
set the motion vectors of the first occlusion region to the first main vector, and
set the motion vectors of the second occlusion region to the second main vector.

7. An apparatus for reconstructing an occlusion region, comprising:
a memory having computer readable instructions stored thereon; and
at least one processor configured to execute the computer readable instructions to,
receive data corresponding to a motion vector field of a video frame,
detect an occlusion region in the motion vector field, the occlusion region corresponding to a portion of the motion vector field not having motion vectors or having inaccurate motion vectors,
detect a contour between the detected occlusion region and a non-occlusion region,
separate the detected contour into a first contour and a second contour based on motion vectors of blocks included in the detected contour,
separate the detected occlusion region into a first occlusion region and a second occlusion region, the first occlusion region adjacent to the first contour, and the second occlusion region adjacent to the second contour,
reconstruct motion vectors of the first occlusion region based on motion vectors of the first contour,
reconstruct motion vectors of the second occlusion region based on motion vectors of the second contour,
perform a first operation of setting the detected occlusion region to the first occlusion region, preparing queues for different FD values, and assigning blocks of the detected occlusion region to the queues based on FD values of blocks,
perform a second operation of outputting a block from a highest queue which is not empty, checking whether the output block can be converted from the first occlusion region to the second occlusion region, and converting the output block from the first occlusion region to the second occlusion region if the output block can be converted from the first occlusion region to the second occlusion region by the result of checking,
perform a third operation of re-calculating an FD value of unprocessed blocks excluding the output block from blocks included in the detected occlusion region, the re-calculating configured to be performed when the output block is converted to the second occlusion region in the first operation, and assigning the unprocessed blocks to the queues, removing one or more of the unprocessed blocks from the queues, or moving one or more of the unprocessed blocks between queues based on the re-calculated FD value, and
perform a fourth operation of repeating the second operation and the third operation until no blocks remain in the queues.

8. The apparatus of claim 1, wherein the motion vector field includes a motion vector field data of an interpolated frame generated by a frame rate up-conversion.

9. The apparatus of claim 1, wherein the processor is further configured to,
perform a frame rate up-conversion on received data corresponding to video frames having reconstructed occlusion regions.

10. An apparatus for reconstructing an occlusion region, comprising:
- a memory having computer readable instructions stored thereon; and
- at least one processor configured to execute the computer readable instructions to,
  - detect an occlusion region in a motion vector field of a video frame,
  - detect a contour between the occlusion region and a non-occlusion region,
  - separate the contour into a first contour and a second contour based on motion vectors corresponding to blocks of the contour,
  - separate the occlusion region into a first occlusion region and a second occlusion region, the first occlusion region adjacent to the first contour, and the second occlusion region adjacent to the second contour,
  - reconstruct motion vectors of the first occlusion region based on motion vectors of the first contour,
  - reconstruct motion vectors of the second occlusion region based on motion vectors of the second contour,
  - perform a first operation of setting the detected occlusion region to the first occlusion region, preparing queues for different FD values, and assigning blocks of the detected occlusion region to the queues based on FD values of blocks,
  - perform a second operation of outputting a block from a highest queue which is not empty, checking whether the output block can be converted from the first occlusion region to the second occlusion region, and converting the output block from the first occlusion region to the second occlusion region if the output block can be converted from the first occlusion region to the second occlusion region by the result of checking,
  - perform a third operation of re-calculating an FD value of unprocessed blocks excluding the output block from blocks included in the detected occlusion region, the re-calculating configured to be performed when the output block is converted to the second occlusion region in the first operation, and assigning the unprocessed blocks to the queues, removing one or more of the unprocessed blocks from the queues, or moving one or more of the unprocessed blocks between queues based on the re-calculated FD value, and
  - perform a fourth operation of repeating the second operation and the third operation until no blocks remain in the queues.

11. The apparatus of claim 10, wherein the occlusion region corresponds to a region which does not have motion vectors.

12. The apparatus of claim 10, wherein the occlusion region corresponds to a region which has inaccurate motion vectors.

13. The apparatus of claim 10, wherein
the first contour has at least a first motion vector, and
the second contour has at least a second motion vector, the second motion vector having a direction different from the first motion vector.

14. The apparatus of claim 10, wherein the processor is further configured to,
- generate the motion vector field by comparing temporally adjacent frames of an input video, and
- provide data corresponding to the motion vector field.

15. The apparatus of claim 10, wherein the processor is further configured to,
- perform a main component analysis of the motion vectors of the blocks of the contour,
- generate a first main vector and a second main vector based on the main component analysis,
- assign blocks having motion vectors represented by a first main vector to the first contour, and
- assign blocks having motion vectors represented by a second main vector to the second contour.

16. The apparatus of claim 15, wherein the processor is further configured to,
- set the motion vectors in the first contour to the first main vector, and
- set the motion vectors in the second contour to the second main vector.

17. The apparatus of claim 16, wherein the processor is further configured to,
- determine whether an area of the first contour and an area of the second contour are mixed with each other, and
- calculate a difference value between the motion vectors of blocks in the first contour and the second contour that are adjacent to each other, and convert the first contour into the second contour or convert the second contour into the first contour based on the determination.

18. The apparatus of claim 15, wherein the processor is further configured to,
- set the motion vectors of the first occlusion region to the first main vector, and
- set the motion vectors of the second occlusion region to the second main vector.

* * * * *